United States Patent
Liao et al.

(10) Patent No.: US 11,958,996 B2
(45) Date of Patent: Apr. 16, 2024

(54) PROTECTION TAPE AND MANUFACTURING METHOD THEREOF

(71) Applicant: NAN YA PLASTICS CORPORATION, Taipei (TW)

(72) Inventors: Te-Chao Liao, Taipei (TW); Chun-Che Tsao, Taipei (TW); Cheng-Hung Chen, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 17/865,291

(22) Filed: Jul. 14, 2022

(65) Prior Publication Data
US 2023/0407146 A1 Dec. 21, 2023

(30) Foreign Application Priority Data
Jun. 15, 2022 (TW) ................... 111122234

(51) Int. Cl.
*C09J 9/02* (2006.01)
*C09J 7/24* (2018.01)
*C09J 123/02* (2006.01)

(52) U.S. Cl.
CPC .............. *C09J 9/02* (2013.01); *C09J 7/243* (2018.01); *C09J 123/025* (2013.01); *C09J 2203/326* (2013.01); *C09J 2301/314* (2020.08); *C09J 2301/416* (2020.08); *C09J 2423/046* (2013.01)

(58) Field of Classification Search
CPC . C09J 9/02; C09J 7/243; C09J 123/025; C09J 2203/326; C09J 2301/314; C09J 2301/416; C09J 2423/046
See application file for complete search history.

(56) References Cited

FOREIGN PATENT DOCUMENTS

| | | | |
|---|---|---|---|
| CN | 103865416 | | 6/2014 |
| CN | 103865416 A | * | 6/2014 ......... H01L 21/6836 |
| CN | 113604169 | | 11/2021 |
| CN | 113604169 A | * | 11/2021 |
| JP | 2007250738 | | 9/2007 |
| JP | 2009203282 | | 9/2009 |
| JP | 2011132354 | | 7/2011 |
| JP | 2013189486 | | 9/2013 |
| JP | 2022009083 | | 1/2022 |
| WO | 2016063916 | | 4/2016 |
| WO | 2018021145 | | 2/2018 |

OTHER PUBLICATIONS

"Office Action of Taiwan Counterpart Application", dated Apr. 20, 2023, p. 1-p. 11.
"Office Action of Taiwan Counterpart Application", dated Jul. 26, 2023, p. 1-p. 12.
"Office Action of Japan Counterpart Application", dated Nov. 21, 2023, p. 1-p. 3.

* cited by examiner

*Primary Examiner* — Daniel McNally
(74) *Attorney, Agent, or Firm* — JCIPRNET

(57) ABSTRACT

A protection tape includes a base film, an antistatic layer and an adhesive layer. The antistatic layer is located on the base film. The surface impedance of the antistatic layer is less than $1E+9\Omega$, and the antistatic layer includes a first resin and conductive materials dispersed in the first resin. The conductive materials include at least one of metal ions and carbon. The adhesive layer is located on a corona treated surface of the base film. The protection tape provided by the present disclosure has the advantage of having resistant to corona treatment.

6 Claims, 6 Drawing Sheets

PROTECTION TAPE AND MANUFACTURING METHOD THEREOF

CROSS-REFERENCE TO RELATED APPLICATION

This application claims the priority benefit of Taiwan application serial no. 111122234, filed on Jun. 15, 2022. The entirety of the above-mentioned patent application is hereby incorporated by reference herein and made a part of this specification.

BACKGROUND

Technical Field

The present invention relates to a protection tape, and more particularly, to a protection tape with an antistatic layer and a manufacturing method thereof.

Description of Related Art

With the advancement of technology, the functions in electronic devices are more and more diversified. For example, in addition to the function of making call, current smart phones also include functions such as surfing the Internet, taking photos, recording videos, and fingerprint recognition. To cope with this development, the number and integration of chips in an electronic device must be increased. Based on the above reasons, how to reduce the thickness of chips or wafers has become a research topic of many manufacturers.

At present, the back grinding process is a common process to reduce the wafer thickness. Generally speaking, before performing the back grinding process, a protection tape is attached to the front side of the wafer to prevent the components on the front side of the wafer from being damaged during the back grinding process.

SUMMARY

The present invention provides a protection tape having an advantage of being resistant to corona treatment.

The present invention provides a method for manufacturing a protection tape, which can manufacture a protection tape having an advantage of being resistant to corona treatment.

At least one embodiment of the present invention provides a protection tape. The protection tape includes a base film, an antistatic layer and an adhesive layer. The antistatic layer is located on the base film. The antistatic layer has a surface impedance of less than 1E+9Ω, and includes a first resin and conductive materials dispersed in the first resin. The conductive material includes at least one of metal ions and carbon. The adhesive layer is located on a corona treated surface of the base film.

At least one embodiment of the present invention provides a method of manufacturing a protection tape including: providing a base film; forming an antistatic layer is on the base film, wherein the antistatic layer includes a first resin and conductive materials dispersed in the first resin, wherein the conductive materials include at least one of metal ions and carbon; performing a corona treatment on the base film to form a corona treated surface of the base film; and forming an adhesive layer on the corona treated surface of the base film, wherein the surface impedance of the antistatic layer after the corona treatment is less than 1E+9Ω.

Based on the above, the adhesive layer is formed on the corona treated surface of the base film, so the adhesive layer can be better attached to the base film. In addition, since the antistatic layer includes the conductive materials dispersed in the resin, even after the corona treatment process, the antistatic layer still has a surface impedance of less than 1E+9Ω.

DESCRIPTION OF THE EMBODIMENTS

Figure 1:
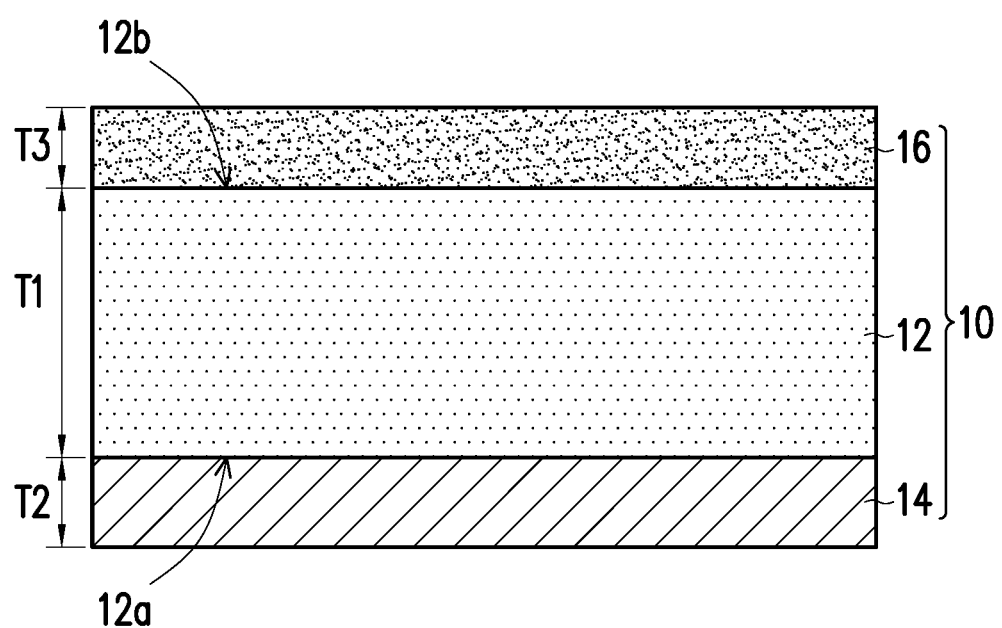
FIG. 1 is a schematic cross-sectional view of a protection tape according to an embodiment of the present invention.

FIG. 1 is a schematic cross-sectional view of a protection tape according to an embodiment of the present invention.

Referring to FIG. 1, the protection tape 10 includes a base film 12, an antistatic layer 14 and an adhesive layer 16.

In some embodiments, the material of the base film 12 includes polyethylene terephthalate (PET) or other suitable materials. In some embodiments, the thickness T1 of the base film 12 is in a range from 25 μm to 150 μm, and preferably in a range from 50 μm to 100 μm.

The antistatic layer 14 is located on the base film 12. For example, the antistatic layer 14 is directly formed on the first surface 12a of the base film 12. In some embodiments, the thickness T2 (thickness of the dry film) of the antistatic layer 14 is in a range from 80 nm to 200 nm. The antistatic layer 14 includes a first resin and conductive materials dispersed in the first resin. In some embodiments, the material of the first resin includes at least one of polyurethane, acrylic, polyester resin, epoxy resin, and alkyd resin.

The conductive material includes at least one of metal ions and carbon, wherein the carbon is, for example, carbon nanotubes or other carbons that can conduct electricity. In some embodiments, the antistatic layer 14 further includes surface-modified filler particles dispersed in the first resin, wherein the surface-modified filler particles are, for example, surface-modified silicon oxide. In some embodiments, the surface-modified filler particles help to avoid the antistatic layer 14 from being scratched by rollers or other objects during manufacture or use.

In this embodiment, the surface resistance of the antistatic layer 14 is less than 1E+9Ω. Therefore, the antistatic layer 14 can reduce or avoid damage to the wafer caused by static electricity during the back-grinding process of the wafer.

The adhesive layer 16 is located on the corona-treated second surface 12b of the base film 12. In this embodiment, the antistatic layer 14 and the adhesive layer 16 are located on opposite sides of the base film 12, but the invention is not limited thereto. In other embodiments, the antistatic layer 14 and the adhesive layer 16 are located on the same side of the base film 12. The corona treatment breaks the chemical bonds of the second surface 12b of the base film 12 to degrade it, and the corona treatment can increase the roughness and surface area of the second surface 12b. Therefore, the adhesive layer 16 subsequently formed on the second surface 12b can be preferably attached to the base film 12. In some embodiments, the roughness of the second surface 12b is greater than the roughness of the first surface 12a. In some embodiments, the corona treatment make the second surface 12b become a surface with polarity.

In some embodiments, the thickness T3 of the adhesive layer 16 is in a range of 0.5 μm to 3 μm, and preferably in the range of 1 μm to 2 μm. In some embodiments, the adhesive layer 16 includes a polyolefin grafted with a monomer having polar functional groups. The monomers with polar functional groups in the adhesive layer 16 include, for example, at least one of glycidyl methacrylate (GMA), vinyl acetate (VA), maleic acid, methyl acrylate and other suitable monomers. In addition, the polyolefin in the adhesive layer 16 includes, for example, polyethylene, polypropylene or other suitable polymer materials. In some embodiments, the Tg of the adhesive layer 16 is about −30 degrees Celsius to 130 degrees Celsius, and the melting point is about 50 degrees Celsius to 150 degrees Celsius.

In some embodiments, the protection tape 10 further includes an unevenness absorption layer (not shown). The unevenness absorption layer is bonded to the adhesive layer 16, and the peeling strength between the unevenness absorption layer and the base film 12 is greater than 20N/25 mm. In some embodiments, the material of the unevenness absorption layer includes polyolefin. For example, the unevenness absorption layer is a hot-melt type polyolefin such as polyethylene, polypropylene, or other suitable polymeric materials. In some embodiments, the aforementioned unevenness absorption layer and the adhesive layer 16 are formed by using different process parameters. Therefore, the aforementioned unevenness absorption layer and the adhesive layer 16 include different properties, but the invention is not limited thereto. In other embodiments, the aforementioned unevenness absorption layer and adhesive layer 16 comprise similar properties. In some embodiments, the adhesive layer 16 is formed by laminating process.

Figure 2:
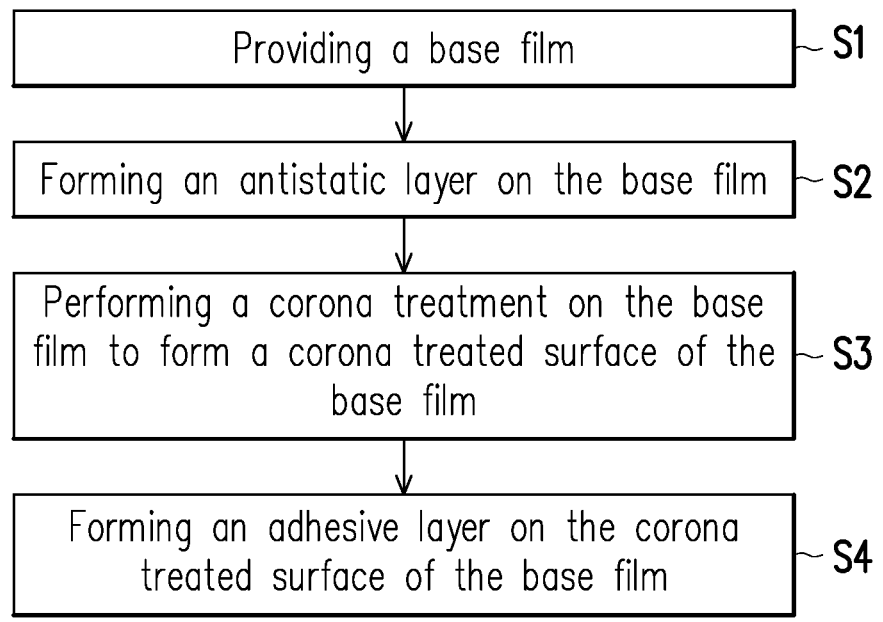
FIG. 2 is a flow chart of a method of manufacturing a protection tape according to an embodiment of the present invention.

FIG. 2 is a flow chart of a method of manufacturing a protection tape according to an embodiment of the present invention. It should be noted herein that, in embodiments provided in FIG. 2, partial content of the embodiments provided in FIG. 1 is followed, and description of the same technical content being omitted. For a description of an omitted part, reference may be made to the foregoing embodiment, and the descriptions thereof are omitted herein.

Referring to FIG. 2, in step S1, a base film is provided.

In step S2, an antistatic layer is formed on the base film. The antistatic layer includes a first resin, conductive materials dispersed in the first resin, and optionally surface-modified filler particles. The conductive materials include at least one of metal ions and carbon. In some embodiments, the method of forming an antistatic layer includes providing a first mixture on the base film. For example, the first mixture is formed on the base film by printing, coating or other suitable process. The first mixture includes 2 wt % to 20 wt % of the first resin, 1 wt % to 5 wt % of the conductive materials, 0.05 wt % to 10 wt % of the surface modified filler particles, 0.05 wt % to 10 wt % of the additives, and 25 wt % to 85 wt % of the first solvent. In some embodiments, the first solvent includes water, an organic solvent, or other suitable solution. In some embodiments, the additives include wetting agents, leveling agents, or other suitable additives.

In step S3, a corona treatment is performed on the base film to form a corona treated surface of the base film.

In step S4, an adhesive layer is formed on the corona-treated surface of the base film. In some embodiments, the method of forming an adhesive layer includes providing a second mixture on the corona-treated surface. For example, the second mixture includes 5 wt % to 20 wt % of the second resin, 0.05 wt % to 10 wt % of the additives, and 50 wt % to 85 wt % of the second solvent. In some embodiments, the second resin comprises a polyolefin grafted with a monomer having polar energy-switching groups.

In this embodiment, since the antistatic layer includes the conductive material dispersed in the resin, even after the corona treatment process, the antistatic layer still has a surface impedance of less than 1E+9Ω.

In some embodiments, after forming the adhesive layer, the adhesive layer and the unevenness absorption layer are bonded.

Hereinafter, some examples of antistatic layers of the present invention are provided, however, these examples are exemplary, and the present invention is not limited to these examples.

Example 1

The first mixture is provided on the base film to form an antistatic layer. The first mixture of Example 1 includes 20 wt % polyester, 1 wt % metal ions, 2.4 wt % filler particles, 0.24 wt % filler particle surface modifier, 0.86 wt % additives and 75.5 wt % water solvent.

An antistatic layer with a thickness of 0.1 μm is formed after curing the first mixture.

Example 2

The first mixture is provided on the base film to form an antistatic layer. The first mixture of Example 2 includes 20 wt % polyester, 2.5 wt % metal ions, 2.4 wt % filler particles, 0.24 wt % filler particle surface modifier, 0.86 wt % additives, and 74 wt % water solvent.

An antistatic layer with a thickness of 0.1 μm is formed after curing the first mixture.

Example 3

The first mixture is provided on the base film to form an antistatic layer. The first mixture of Example 3 includes 20 wt % acrylic, 2.5 wt % metal ions, 2.4 wt % filler particles, 0.24 wt % filler particle surface modifier, 0.86 wt % additives and 74 wt % water solvent.

An antistatic layer with a thickness of 0.1 μm is formed after curing the first mixture.

Example 4

The first mixture is provided on the base film to form an antistatic layer. The first mixture of Example 4 includes 20 wt % polyester, 2.5 wt % carbon nanotubes, 2.4 wt % filler particles, 0.24 wt % filler particle surface modifier, 0.86 wt % additives and 74 wt % water solvent.

An antistatic layer with a thickness of 0.1 μm is formed after curing the first mixture.

Example 5

The first mixture is provided on the base film to form an antistatic layer. The first mixture of Example 5 includes 20 wt % polyester, 5 wt % carbon nanotubes, 2.4 wt % filler particles, 0.24 wt % filler particle surface modifier, 0.86 wt % additives and 71.5 wt % water solvent.

An antistatic layer with a thickness of 0.1 μm is formed after curing the first mixture.

Comparative Example 1

The first mixture is provided on the base film to form an antistatic layer. The first mixture of Comparative Example 1 includes 20 wt % polyester, 5 wt % conductive polymer, 2.4 wt % filler particles, 0.24 wt % filler particle surface modifier, 0.86 wt % additive and 71.5 wt % water solvent.

An antistatic layer with a thickness of 0.1 μm is formed after curing the first mixture.

Comparative Example 2

The first mixture is provided on the base film to form an antistatic layer. The first mixture of Comparative Example 2 includes 1.5 wt % polyester, 5 wt % conductive polymer, 2.4 wt % filler particles, 0.24 wt % filler particle surface modifier, 0.86 wt % additive and 90 wt % water solvent.

An antistatic layer with a thickness of 0.05 μm is formed after curing the first mixture.

Comparative Example 3

The first mixture is provided on the base film to form an antistatic layer. The first mixture of Comparative Example 3 includes 20 wt % polyester, 0.5 wt % carbon nanotubes, 2.4 wt % filler particles, 0.24 wt % filled particle surface modifier, 0.86 wt % additives, and 76 wt % water solvent.

An antistatic layer with a thickness of 0.05 μm is formed after curing the first mixture.

Table 1 is some properties of the antistatic layers of Examples 1 to 5 and Comparative Examples 1 to 3.

TABLE 1

|  | Example | | | | | Comparative Example | | |
| --- | --- | --- | --- | --- | --- | --- | --- | --- |
|  | 1 | 2 | 3 | 4 | 5 | 1 | 2 | 3 |
| Surface impedance (log Ω/sq) | 8.4 | 7.5 | 7.2 | 8.3 | 7.8 | 7.8 | 6.5 | 10.8 |
| Surface impedance after corona treatment (log Ω/sq) | 8.8 | 7.6 | 7.3 | 7.9 | 7.5 | 14.5 | 12.8 | 11.5 |
| light transmittance (%) | 90.68 | 90.85 | 90.77 | 90.25 | 90.85 | 91.25 | 90.68 | 91.38 |
| Haze (%) | 0.67 | 0.78 | 0.85 | 0.75 | 0.83 | 3.25 | 3.45 | 0.42 |
| Adhesion | 5B | 5B | 5B | 5B | 5B | 5B | 1B | 5B |

In Table 1, surface impedance and surface impedance after the corona treatment refer to the surface impedance of the antistatic layer before and after corona treatment, respectively. Light transmittance and haze refer to the light transmittance and haze of the antistatic layer and the base film as a whole. Adhesion refers to the adhesion between the antistatic layer and the base film obtained by the cross-cut test.

It can be known from Table 1 that in Examples 1 to 5, the surface impedance of the antistatic layer after corona treatment is still less than the surface impedance of 1E+9Ω. Therefore, even if the adhesion between the subsequently formed adhesive layer and the base film is increased by the corona treatment, the antistatic layer will not lose its antistatic ability.

FIG. 3A to FIG. 3D are schematic cross-sectional views of a method of using a protection tape according to an embodiment of the present invention. It should be noted herein that, in embodiments provided in FIG. 3A to FIG. 3D, partial content of the embodiments provided in FIG. 1 is followed, and description of the same technical content being omitted. For a description of an omitted part, reference may be made to the foregoing embodiment, and the descriptions thereof are omitted herein.

Figure 3A:
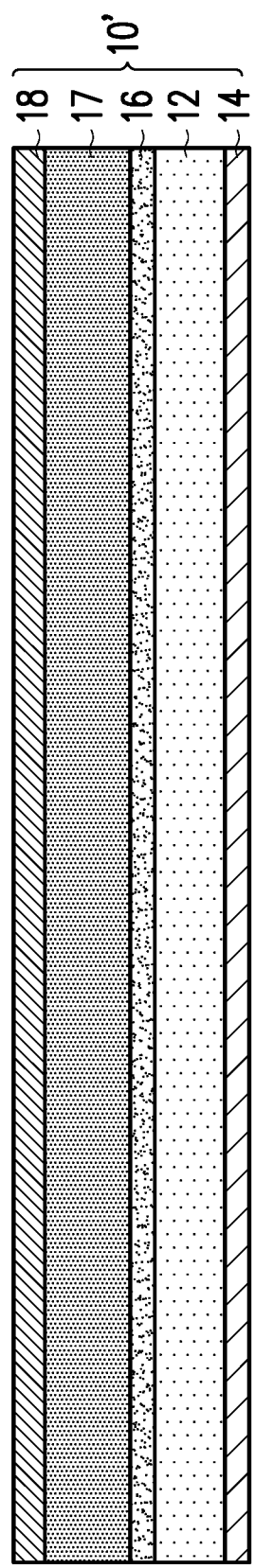
FIG. 3A to FIG. 3D are schematic cross-sectional views of a method of using a protection tape according to an embodiment of the present invention.

Referring to FIG. 3A, after forming the adhesive layer 16, the adhesive layer 16 is bonded to the unevenness absorption layer 17. An optionally photosensitive adhesive 18 may be provided on the unevenness absorption layer 17.

In this embodiment, the protection tape 10' includes a base film 12, an antistatic layer 14, an adhesive layer 16, an unevenness absorption layer 17 and a photosensitive adhesive 18.

Figure 3B:
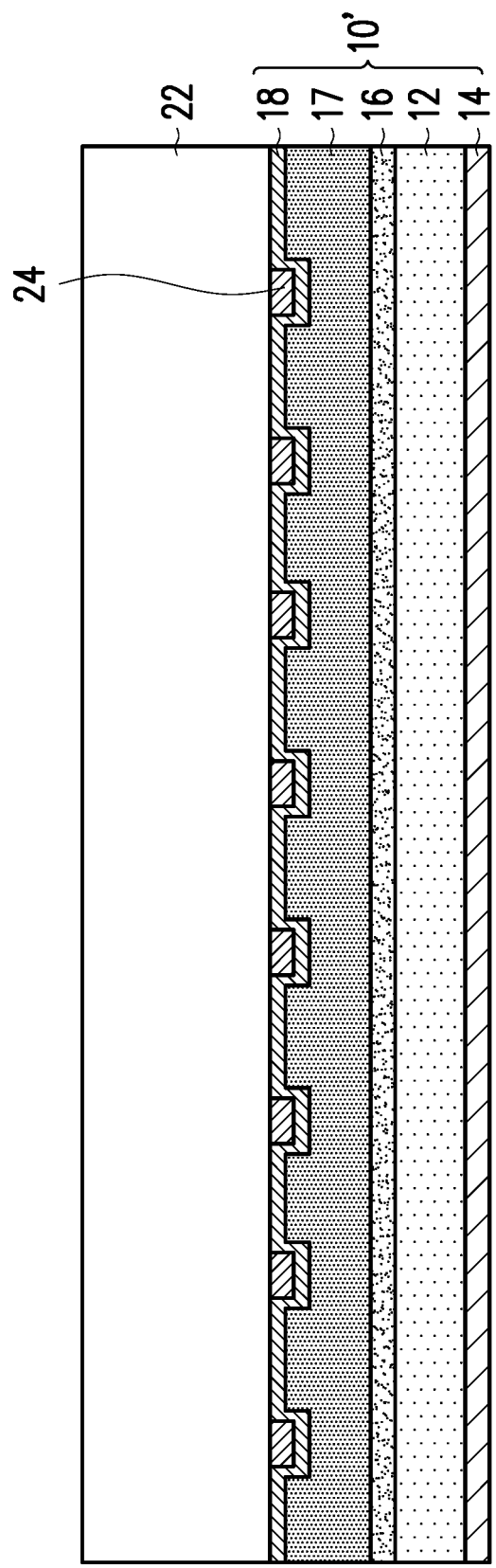

Referring to FIG. 3B, the protection tape 10' is bonded to the front side of the wafer 22. In this embodiment, the front surface of the wafer 22 has a plurality of conductive structures 24. The conductive structures 24 are, for example, solder balls, passive elements or other components. In this embodiment, the photosensitive adhesive 18 is formed on the unevenness absorption layer 17, and then the protection tape 10' is bonded to the front surface of the wafer 22, but the invention is not limited thereto. In other embodiments, the photosensitive adhesive 18 is formed on the front side of the wafer 22, and then the protection tape is bonded to the front side of the wafer 22.

Figure 3C:
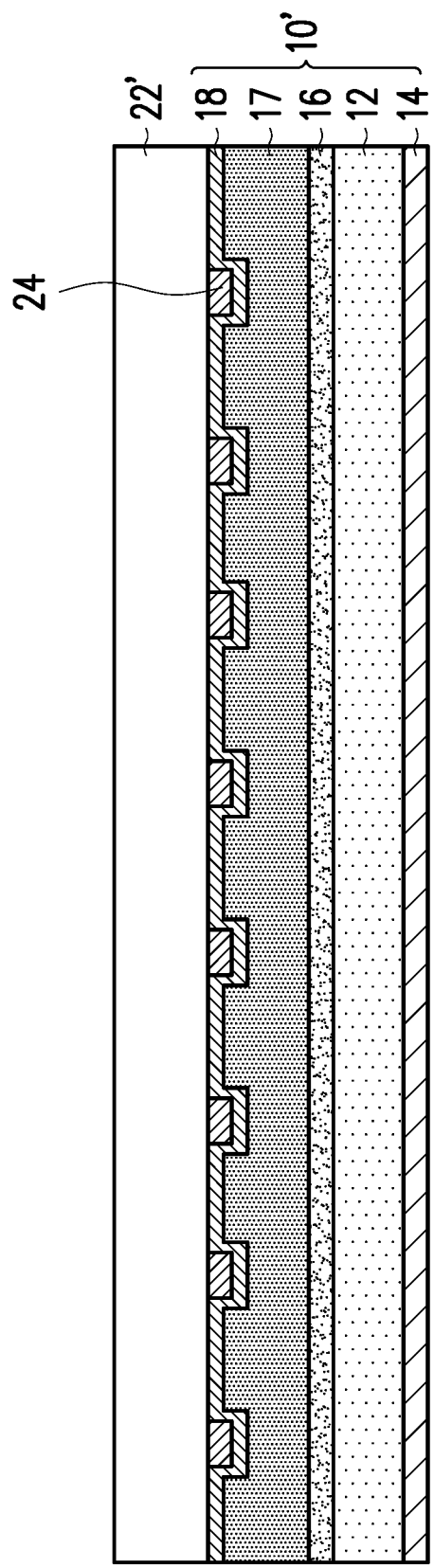

Referring to FIG. 3C, a back-grinding process is performed on the wafer 22 to form the thinned wafer 22'.

Figure 3D:
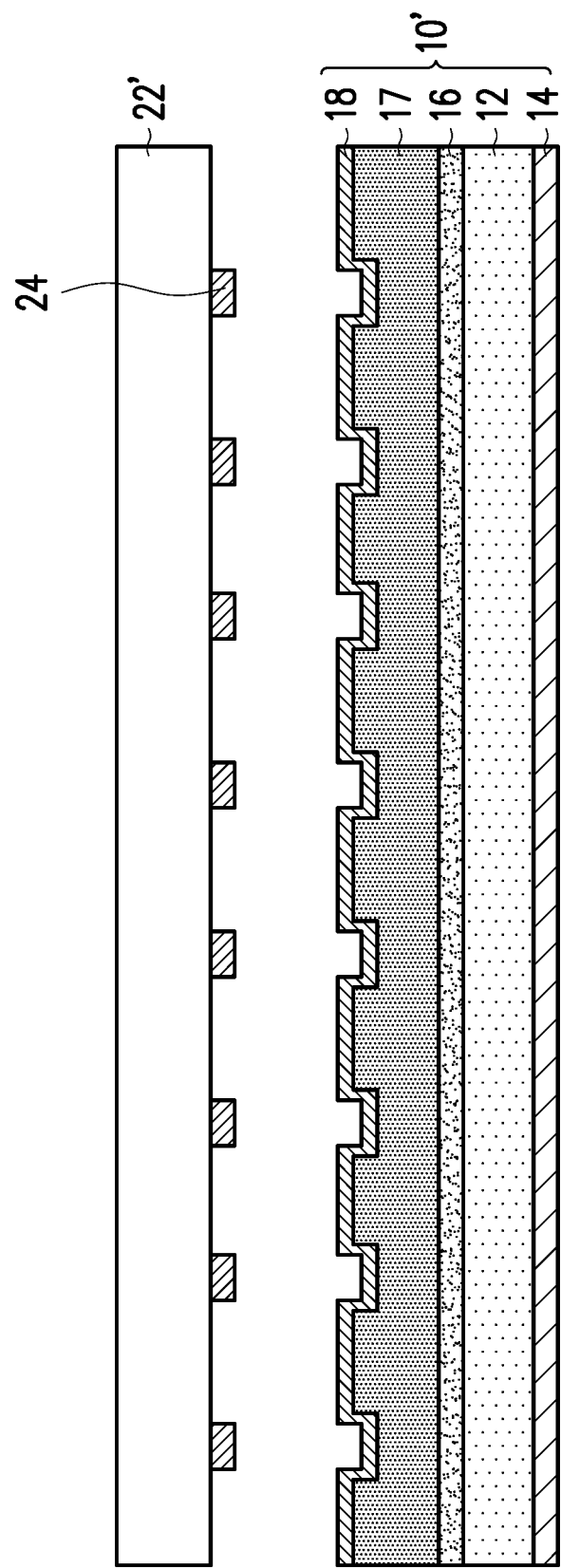

At last, referring to FIG. 3D, the photosensitive adhesive 18 is illuminated to reduce the stickiness of the photosensitive adhesive 18, and then the protection tape 10' is removed from the surface of the wafer 22'. In this embodiment, the peeling strength between the unevenness absorption layer 17 and the base film 12 is greater than 20N/25 mm. When the protection tape 10' is peeling off, the unevenness absorption layer 17 and the base film 12 are not prone to the problem of interlayer peeling. In addition, since the surface impedance of the antistatic layer 14 is less than 1E+9Ω, the static electricity generated when peeling off the protection tape 10' can be prevented from damaging the conductive structure 24 on the front surface of the wafer 22'.

What is claimed is:

1. A manufacturing method of a protection tape, comprising:
    providing a base film;
    forming an antistatic layer on the base film, wherein the antistatic layer comprises:
        a first resin; and
        conductive materials, dispersed in the first resin, wherein the conductive materials comprise at least one of metal ions and carbon, wherein forming the antistatic layer on the base film comprises:

providing a first mixture on the base film, wherein the first mixture comprises 2 wt % to 20 wt % of the first resin, 1 wt % to 5 wt % of the conductive materials, 0.05 wt % to 10 wt % of surface modified filler particles, 0.05 wt % to 10 wt % of first additives, and 25 wt % to 85 wt % of a first solvent;

performing a corona treatment on the base film to form a corona treated surface of the base film; and forming an adhesive layer on the corona treated surface of the base film, wherein the surface impedance of the antistatic layer after the corona treatment is less than 1E+9Ω.

2. The manufacturing method of the protection tape of claim 1, wherein forming the adhesive layer on the corona treated surface of the base film comprises:

providing a second mixture on the corona treated surface, wherein the second mixture comprises 5 wt % to 20 wt % of a second resin, 0.05 wt % to 10 wt % of second additives, and 50 wt % to 85 wt % of a second solvent, wherein the second resin comprises a polyolefin grafted with a monomer having a polar functional group.

3. The manufacturing method of the protection tape of claim 2, wherein the monomer having the polar functional group comprises at least one of glycidyl methacrylate, vinyl acetate, maleic acid and methyl acrylate.

4. The manufacturing method of the protection tape of claim 1, further comprising:

bonding the adhesive layer with an unevenness absorption layer, wherein a peeling strength between the unevenness absorption layer and the base film is greater than 20N/25 mm, and a material of the unevenness absorption layer comprises polyolefin resin.

5. The manufacturing method of the protection tape of claim 1, wherein a material of the base film comprises polyethylene terephthalate.

6. The manufacturing method of the protection tape of claim 1, wherein a material of the first resin comprises at least one of polyurethane, acrylic, polyester resin, epoxy resin and alkyd resin.

* * * * *